(12) United States Patent
Bradbury et al.

(10) Patent No.: US 10,942,088 B2
(45) Date of Patent: Mar. 9, 2021

(54) OPTO-MECHANICAL FUSE

(71) Applicant: International Business Machines Corporation, Armonk, NY (US)

(72) Inventors: Jonathan D. Bradbury, Poughkeepsie, NY (US); Jonathan Fry, Fishkill, NY (US); Michael Kane, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/201,665

(22) Filed: Nov. 27, 2018

(65) Prior Publication Data

US 2020/0166430 A1 May 28, 2020

(51) Int. Cl.
*G01M 11/00* (2006.01)

(52) U.S. Cl.
CPC .............................. *G01M 11/3145* (2013.01)

(58) Field of Classification Search
CPC ................................................. G01M 11/3145
See application file for complete search history.

(56) References Cited

U.S. PATENT DOCUMENTS

| | | |
|---|---|---|
| 5,184,517 A | 2/1993 | Kelzer et al. |
| 5,261,015 A * | 11/1993 | Glasheen ............... G02B 6/356 |
| | | 385/23 |
| 5,739,425 A | 4/1998 | Binning et al. |
| 5,789,682 A | 8/1998 | Dickinson et al. |
| 6,094,144 A | 7/2000 | Dishongh et al. |
| 6,366,209 B2 | 4/2002 | Dishongh et al. |
| 6,452,502 B1 | 9/2002 | Dishongh et al. |
| 7,391,576 B2 | 6/2008 | Vigier-Blanc |
| 7,621,190 B2 | 11/2009 | Ahmad et al. |
| 7,655,269 B2 | 2/2010 | Mayer et al. |
| 7,683,627 B2 | 3/2010 | Tsukuda |
| 7,741,834 B2 | 6/2010 | Dang et al. |
| 8,767,219 B2 | 7/2014 | Rutten |

(Continued)

FOREIGN PATENT DOCUMENTS

| | | |
|---|---|---|
| DE | 102014218974 A1 | 3/2016 |
| EP | 2546616 A1 | 1/2013 |

OTHER PUBLICATIONS

Anonymous, "Sensor Arrangement", 2015, IP.com Prior Art Database Technical Disclosure, 24 pages.

(Continued)

*Primary Examiner* — Georgia Y Epps
*Assistant Examiner* — Don J Williams
(74) *Attorney, Agent, or Firm* — Cantor Colburn LLP; Teddi Maranzano

(57) ABSTRACT

An opto-mechanical fuse is provided. The opto-mechanical fuse includes a chassis component, an extrusion disposed on a monitored component proximate to the chassis component and a sensor. The sensor includes an optical conductor mounted to the chassis component to assume one of an optically transmitting state and an optically non-transmitting state in both power-on and power-off conditions. An assumption of the optically non-transmitting state by the optical conductor occurs due to an interaction of the optical conductor and the extrusion resulting from a predefined magnitude of deflection of the monitored component.

20 Claims, 6 Drawing Sheets

(56) References Cited

U.S. PATENT DOCUMENTS

| | | |
|---|---|---|
| 8,869,624 B2 | 10/2014 | Schnetker et al. |
| 9,086,267 B2 | 7/2015 | Ahmad et al. |
| 10,533,919 B2 | 1/2020 | Bradbury |
| 10,697,851 B2 | 6/2020 | Bradbury et al. |
| 2004/0129868 A1 | 7/2004 | Kilmartin |
| 2006/0018029 A1 | 1/2006 | Vigier-Blanc |
| 2012/0206735 A1 | 8/2012 | Rutten |
| 2014/0013855 A1 | 1/2014 | Farahani et al. |
| 2015/0149754 A1 | 5/2015 | Hu |
| 2018/0047644 A1 | 2/2018 | Davis et al. |

OTHER PUBLICATIONS

Elger et al., "Optical Leak Detection for Wafer Level Hermeticity Testing", 2004 IEEE/SEMI Int'l Electronics Manufacturing Technology Symposium, 6 pages.

IBM "List of IBM Patents or Patent Applications Treated as Related"; (Appendix P); filed Sep. 24, 2020; 2 pgs.

* cited by examiner

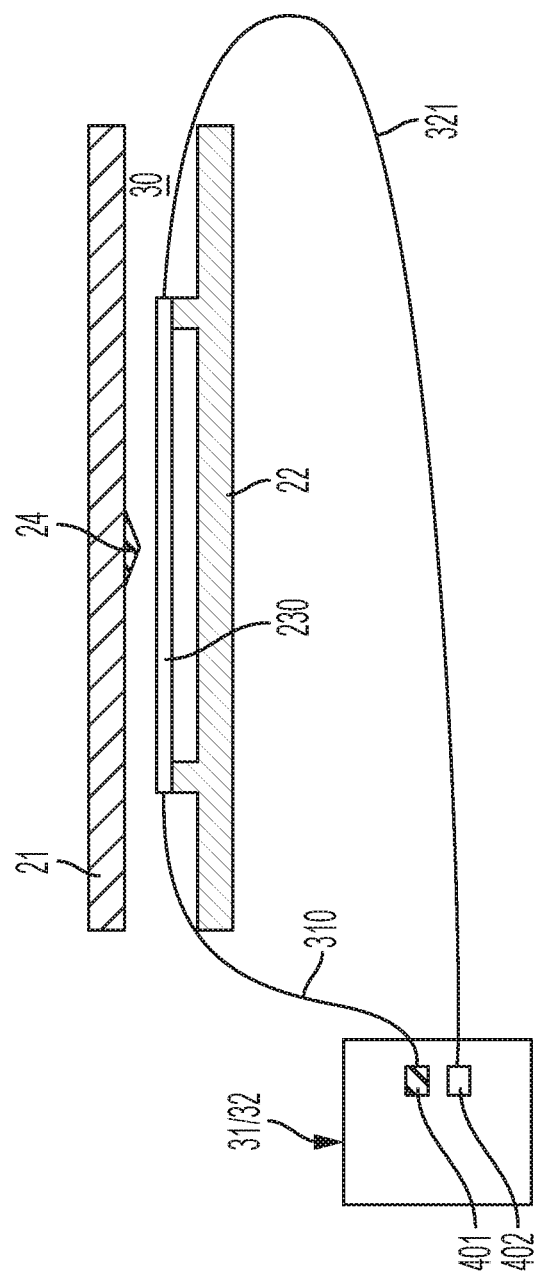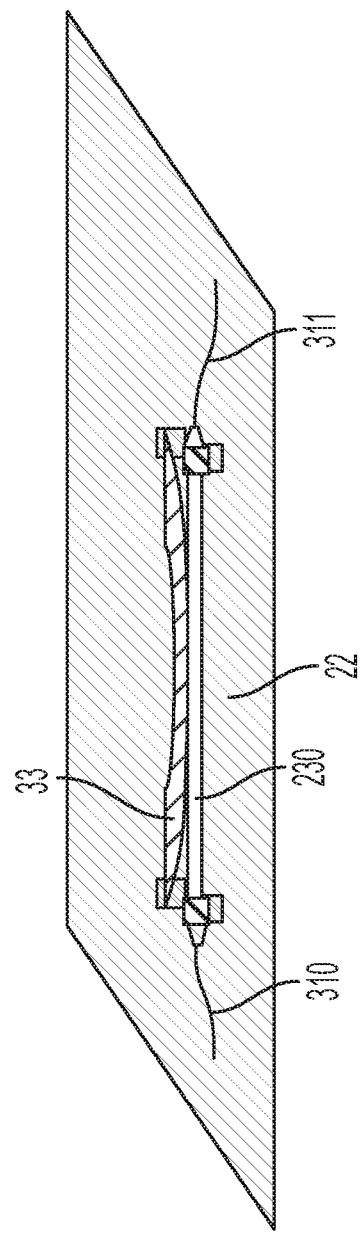

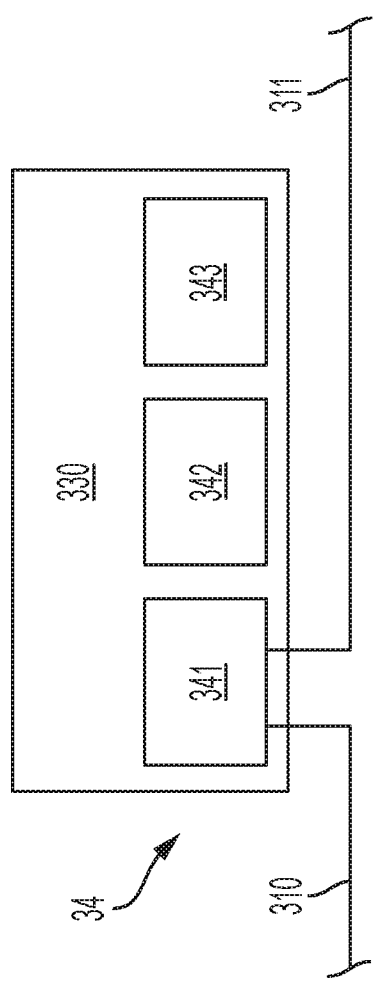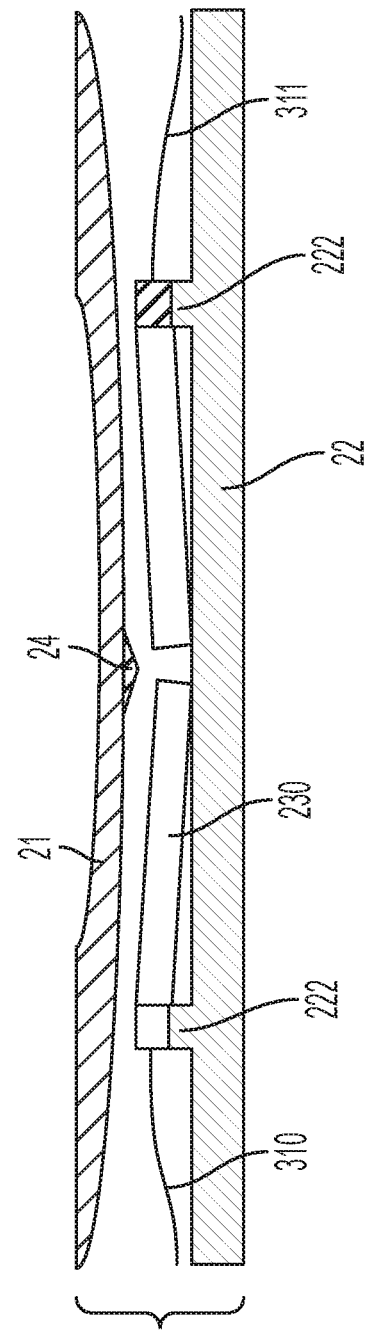

OPTO-MECHANICAL FUSE

BACKGROUND

The disclosure relates generally to an electro-mechanical fuse that is configured to detect a predefined magnitude of deflection of a monitored component.

Deflection, or the ability of a component to deflect, is a characteristic of components in many products for which there are specific critical tolerances. Therefore, the ability to detect cases where deflection tolerances have been exceeded can be important to maintaining a product as well as preventing unsafe conditions. As such, a device that is capable of detecting and recording occurrences of out of tolerance deflection is often needed to ensure quality and reliability of products.

SUMMARY

According to one or more embodiments, an opto-mechanical fuse is provided. The opto-mechanical fuse includes a chassis component, an extrusion disposed on a monitored component proximate to the chassis component and a sensor. The sensor includes an optical conductor mounted to the chassis component to assume one of an optically transmitting state and an optically non-transmitting state in both power-on and power-off conditions. An assumption of the optically non-transmitting state by the optical conductor occurs due to an interaction of the optical conductor and the extrusion resulting from a predefined magnitude of deflection of the monitored component.

According to one or more embodiments, an opto-mechanical fuse is provided. The opto-mechanical fuse includes a chassis component disposable within a computing device housing, an extrusion disposed on a monitored component proximate to the chassis component and a sensor. The sensor includes an optical conductor mounted to the chassis component to permit clean deflection or breakage of the optical conductor such that the optical conductor assumes one of an optically transmitting state and an optically non-transmitting state in both power-on and power-off conditions. An assumption of the optically non-transmitting state by the optical conductor occurs due to breakage of the optical conductor by the extrusion resulting from monitored component deflection of a predefined magnitude. The assumption of the optical non-transmitting state by the optical conductor results in a measurable decrease in light transmission through the optical conductor.

According to one or more embodiments, a method of operating an opto-mechanical fuse for detecting a predefined action of or relative to a monitored component is provided. The method includes disposing an extrusion on the monitored component with the monitored component proximate to a chassis component, mounting a sensor to the chassis component, configuring the sensor with an optical conductor to be breakable in power-on and power-off conditions by the extrusion as a result of the predefined action of or relative to the monitored component and configuring the sensor to determine whether an optical signal is transmittable through the optical conductor and to signal an occurrence of a breakage during power-on conditions following the breakage.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a side view of components of an opto-mechanical fuse for use with or in the computing device housing of FIG. 1 in accordance with embodiments;

FIG. 5 is a side view of additional components of an opto-mechanical fuse for use with or in the computing device housing of FIG. 1 in accordance with embodiments;

FIG. 6 is a schematic illustration of circuitry of the opto-mechanical fuse of FIGS. 2-5 in accordance with embodiments;

FIG. 7 is a side view of the opto-mechanical fuse of FIGS. 2-5 following a breakage incident;

Figure 1:
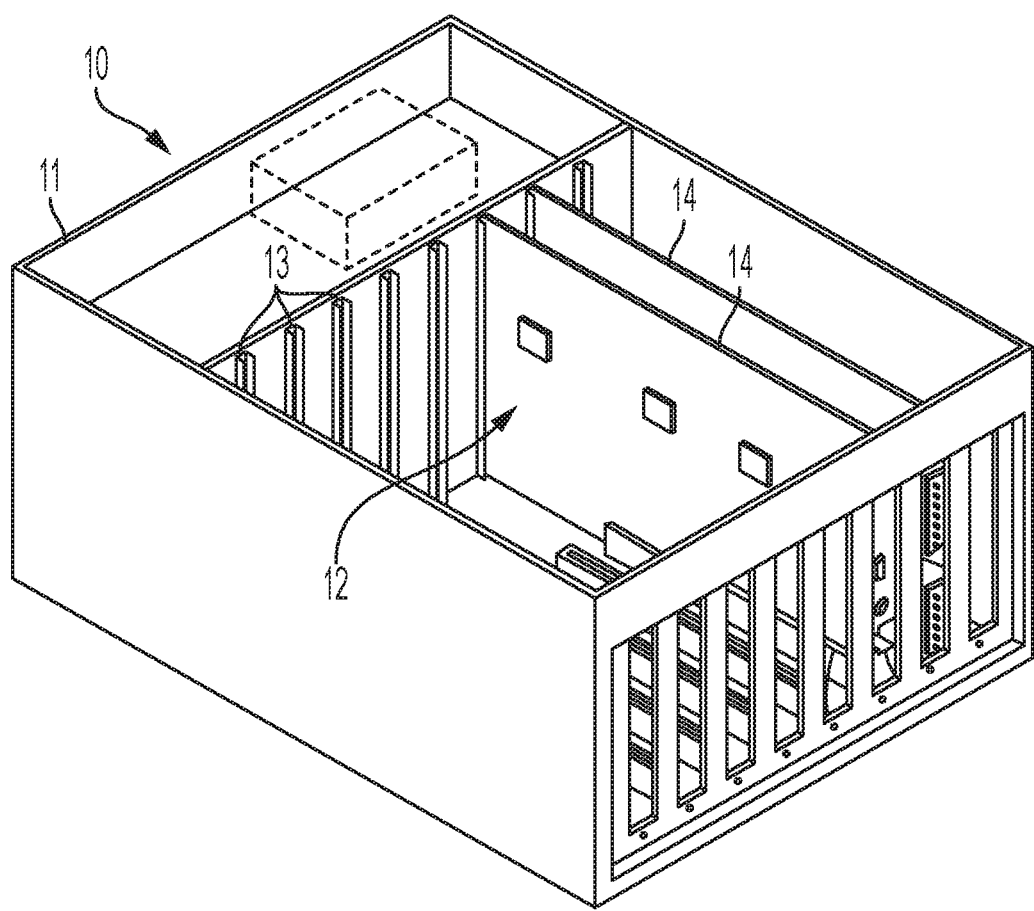
FIG. 1 is a perspective view of a computing device housing in accordance with embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, certain computing devices have a housing with card slots in the interior of the housing that are configured to receive certain components (i.e., cards). These cards can have various electrical components disposed thereon including, but not limited to, processors and memory chips. As such, damage to the cards can lead to malfunctions of the electrical components and the computing devices as a whole. Damage can be caused by multiple factors including, but not limited to, deflections of the cards that exceed tolerances. These types of deflections can occur during transportation of the computing devices and during insertion and removal of the cards from the card slots and, when deflections that could lead to damage occur, it is often the case that the computing devices are powered off.

Turning now to an overview of the aspects of the invention, one or more embodiments of the invention address the above-described shortcomings of the prior art by providing a computing device with a capability to detect cases where deflection tolerances have been exceeded and might possibly lead to damaged electrical components even if those cases occurred while the computing device is powered off.

The above-described aspects of the invention address the shortcomings of the prior art by provision of an opto-mechanical fuse. The opto-mechanical fuse can provide a computing device with a capability to detect cases where deflection tolerances have been exceeded and might possibly lead to damaged electrical components even if those cases occurred while the computing device is powered off. The opto-mechanical fuse includes a chassis component, an extrusion disposed on a monitored component proximate to the chassis component and a sensor. The sensor includes a brittle optical conductor mounted to the chassis component to assume one of an optically transmitting state and an optically non-transmitting state in both power-on and power-off conditions. An assumption of the optically non-transmitting state by the brittle optical conductor occurs due to an interaction of the brittle optical conductor and the extrusion resulting from a predefined magnitude of deflection of the monitored component.

Turning now to FIG. 1, a computing device housing 10 is provided for use in the assembly and operation of a computing device and includes a volumetric body 11 having a pair of opposite major surfaces (of which, one is missing or removed) and two pairs of opposite minor surfaces that define an interior 12. Within the interior 12, the computing device housing 10 accommodates various components including, but not limited to, slots 13 and cards or printed circuit boards (PCBs) 14. The PCBs 14 are insertable into the slots 13 in various configurations and arrangements to achieve a certain computing capability for the computing device. In the illustration of FIG. 1, two PCBs 14 are shown as having been inserted into two slots 13 but six additional slots 13 are available.

During transport, maintenance or repair of the computing device, external forces can be applied to the components mentioned above. For example, during a replacement or repair of one of the PCBs 14, an operator may insert his hand into the interior 12 and intentionally or unintentionally deflect the other PCB 14. Such deflection can either be within predefined tolerances or in excess of predefined tolerances. Where the deflection of the PCB 14 exceeds the predefined tolerances, the deflection can lead to damage or a shorting out of components on the deflected PCB 14. Thus, the deflection tolerances are typically established such that they are exceeded well before actual damage occurs.

In a conventional computing device, conventional sensors can be provided in order to detect the deflection of the PCB 14 (hereinafter referred to as a "monitored component") so that deflections which approach or exceed the predefined tolerances can be identified and, if necessary, addressed. The conventional sensors may include, for example, sacrificial sensors, strain gauges, and accelerometers. The sacrificial sensors tend to require substantial real estate on the monitored component relative to the size of the monitored component. The strain gages typically provide for deflection sensing action but not hysteresis and thus need to be activated and currently reading in order to record a deflection. The accelerometers exhibit similar problems as the sacrificial sensors and the strain gauges.

As will be described herein, a sensor design is provided which is capable of detecting out-of-tolerance forces, torques or deflections in PCBs or other similar components and for other associated uses. The sensor design is tailorable for use in various environments and low cost.

With reference to FIGS. 2-7, an opto-mechanical fuse 20 is provided. The opto-mechanical fuse 20 is configured in particular for identifying deflection of a monitored component 21 and especially for detecting out-of-tolerance deflections of the monitored component 21.

Figure 2:
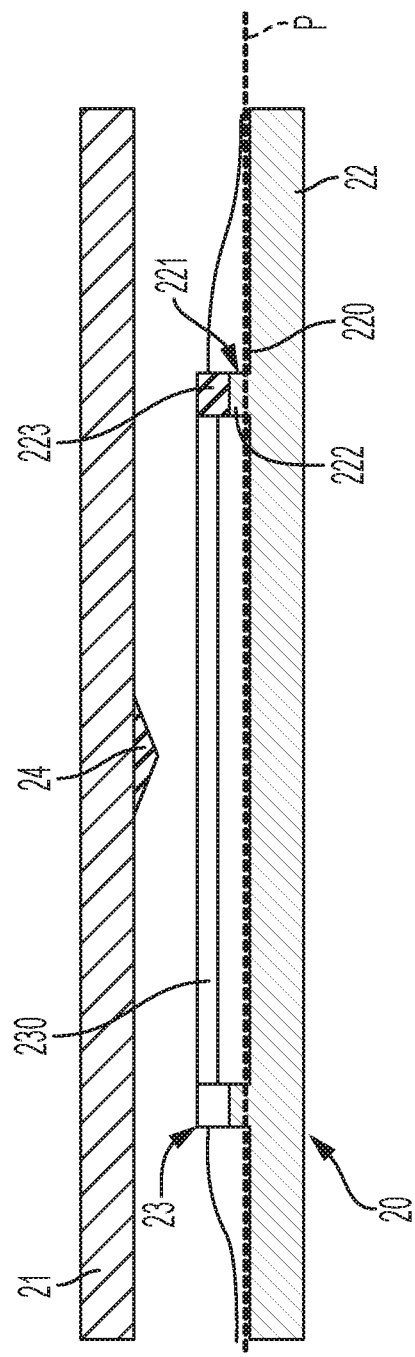
FIG. 2 is a side view of an opto-mechanical fuse for use with or in the computing device housing of FIG. 1 in accordance with embodiments.

As shown in FIG. 2, the opto-mechanical fuse 20 includes a chassis component 22, a sensor 23 including an optical conductor 230 and one or more extrusions 24. The chassis component 22 may be provided as a fixed or unfixed and possibly rigid component of the computing device housing 10 of FIG. 1 and may include a wall portion or an internal structural feature of the computing device housing 10. In any case, the chassis component 22 is provided within the computing device housing 10 and includes a surface 220 and a mounting 221. The surface 220 has a plane P which is substantially flat whereby a deflection of the monitored component 21 can be established and measured relative to the surface 220. The mounting 221 may include one or more bosses 222 and one or more mounting clips 223. The one or more bosses 222 protrude outwardly from the plane P of the surface 220.

The optical conductor 230 of the sensor 23 is mounted to the bosses 222 by the mounting clips 223 such that the optical conductor 230 is effectively mounted to the chassis component 22. Being mounted in this manner, the optical conductor 230 is configured to assume one of an optically transmitting state (see FIGS. 2-5) and an optically non-transmitting state (see FIG. 7). The optically transmitting state is a state in which the optical conductor 230 is capable of transmitting an optical signal therethrough at a signal strength that is at least a substantial fraction of a baseline signal strength. The optically non-transmitting state is a state in which the optical conductor 230 is incapable of transmitting an optical signal therethrough at a signal strength that is any greater than a small fraction of the baseline signal strength.

The optical conductor 230 of the sensor 23 is configured to remain generally intact and thus to continue to assume the optically transmitting state in power-on and power-off conditions. Conversely, the optical conductor 230 of the sensor 23 is also configured to be cleanly and mechanically deflectable or breakable in the power-on and the power-off conditions by the extrusion 24 as a result of a predefined magnitude of deflection of the monitored component 21 having occurred to thus assume the optically non-transmitting state. The bosses 222 and the mounting clips 223 of the mounting 221 are configured and sized to permit and be supportive of the clean mechanical deflection or breakage of the optical conductor 230. The sensor 23 is further configured to electrically signal an occurrence of the clean mechanical deflection or breakage of the optical conductor 230 and thus the assumption by the optical conductor 230 of the optically non-transmitting state during power-on conditions or once power-on conditions take effect following the clean mechanical deflection or breakage of the optical conductor 230. Such electronic signaling may be automatic or responsive to interrogation or sampling of the sensor 23.

Figure 3:
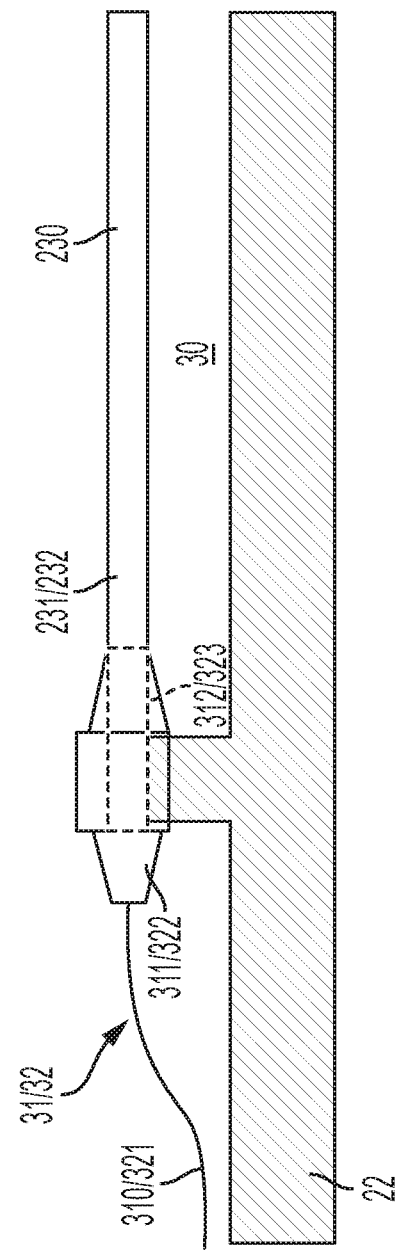
FIG. 3 is an enlarged side view of components of an opto-mechanical fuse for use with or in the computing device housing of FIG. 1 in accordance with embodiments.

In accordance with embodiments, the sensor 23 may include or be provided as an optical conductor assembly 30 (see FIGS. 3 and 4). The optical conductor assembly 30 includes the optical conductor 230, an optical emitter 31 and an optical sensor 32. The optical conductor 230 is formed of a brittle material and has a first end 231 and a second end 232 opposite the first end 231. The optical emitter 31 includes a first fiber link 310, a first optical connector 311 and a flexible retention sleeve 312. The first optical connector 311 optically couples the first end 231 of the optical conductor 230 to the first fiber link 310. The flexible retention sleeve 312 is supportive of the first end 231 of the optical conductor 230 when the optical conductor 230 is intact and still permits the clean mechanical deflection or breakage of the optical conductor 230. The optical sensor 32 includes a second fiber link 321, a second optical connector 322 and a flexible retention sleeve 323. The second optical connector 322 optically couples the second end 232 of the optical conductor 230 to the second fiber link 321. The flexible retention sleeve 323 is supportive of the second end 232 of the optical conductor 230 when the optical conductor 230 is intact and still permits the clean mechanical deflection or breakage of the optical conductor 230.

In accordance with embodiments and, as shown in FIG. 4, at least one of the optical emitter 31 and the optical sensor 32 have components that are remotely connected to the optical conductor 230. That is, at least one of a signal generating element 401 of the optical emitter 31 and a signal receiving and measuring element 402 of the optical sensor 32 can be remotely connected to the optical conductor 230 by way of the first fiber link 310 and the second fiber link 321, respectively.

During operations of the sensor 23, when the optical conductor 230 is intact, the optical emitter 31 emits optical signals through the optical conductor 230 and toward the optical sensor 32 whereby the optical sensor 32 is receptive of the optical signals at signal strengths which are substantial fractions of baseline signal strengths. Conversely, when the optical conductor is not intact (i.e., has been deflected or broken), the optical emitter 32 is not receptive of the optical signals or is receptive the optical signals at low signal strengths. That is, the optical emitter 32 is receptive of an optical signal emitted by the optical emitter 31 and transmitted through the optical conductor 230 in an exclusive event the optical conductor 230 assumes the optically transmitting state. Meanwhile, in an event the optical conductor assumes the optically non-transmitting state (i.e., the optical conductor 230 is deflected or broken), there is a measurable decrease in light transmission through the optical conductor 230 whereby the optical sensor 32 is not receptive of the optical signal emitted by the optical emitter 31.

As shown in FIG. 5, the sensor 23 or optical conductor assembly 30 can also include an elastic element 33. The elastic element 33 is disposed proximate to or in contact with the optical conductor 230. The elastic element 33 can be pre-loaded such that, when the optical conductor 230 is deflected or broken by the extrusion 24 as a result of a predefined magnitude of deflection of the monitored component 21 having occurred, the elastic element 33 applies an elastic bias onto the optical conductor 230 that encourages the full breakage of the optical conductor 230 and thus urges the optical conductor 230 to assume the optically non-transmitting state.

As shown in FIG. 6, the sensor 23 or the optical conductor assembly 30 can also include circuitry 34. The circuitry 34 is connectable with the first and second fiber links 310 and 321 and includes at least a processing circuit 340. The processing circuit 340 may include a processor 341, which is connectable with the optical emitter 31 and the optical sensor 32, a memory unit 342 and a networking unit 343 which provides for communications between the processor 341 and external devices. The memory unit 342 has executable instructions stored thereon for execution by the processor 341. When the executable instructions are read and executed by the processor 341, the executable instructions cause the processor 341 to operate as described herein.

For example, in a case where the optical conductor 230 is cleanly mechanically broken by the extrusion 24 during a power-off condition, the executable instructions may be configured to cause the processor 341 to be receptive of a sampling signal from an external device upon power-up conditions taking effect, to then determine whether the circuitry 34 is optically open (i.e., the optical sensor 32 is not receptive of an optical signal emitted by the optical emitter 31) as a result of the clean mechanical breakage and to correspondingly electrically signal to the external device that an occurrence of the clean mechanical breakage has occurred at some point during the power-off conditions.

In accordance with embodiments, the determining of whether the circuitry 34 is optically open may be conducted by the processor 341 instructing the optical emitter 31 to emit an optical signal through the optical conductor 230 and interrogating the optical sensor 32 as to whether the optical signal has been received and read by the optical sensor 32. In an event that the optical sensor 32 has not received or read the optical signal, the processor 341 determines that the circuitry 34 is optically open and that the optical conductor 230 has been broken and thus assumes the optically non-transmitting state. The operations of the optical emitter 31 and the optical sensor 32 by the processor 341 can be conducted periodically, in response to an interrogation or a sampling during power-on conditions, upon power-on conditions taking effect and/or in response to an interrogation or a sampling which occurs when power-on conditions take effect.

In accordance with further embodiments, the determining of whether the circuitry 34 is optically open may be conducted by the processor 341 instructing the optical emitter 31 to emit an optical signal through the optical conductor 230 and interrogating the optical sensor 32 as to whether the optical signal has been received and read by the optical sensor 32 at an initial time when the optical conductor 230 is known to assume the optically transmitting state. This permits the processor 341 to establish a baseline signal strength of an optical signal passing through the optical conductor 230 when the optical conductor 230 is intact. Subsequently, the operations of the optical emitter 31 and the optical sensor 32 by the processor 341 can be conducted periodically, in response to an interrogation or a sampling during power-on conditions, upon power-on conditions taking effect and/or in response to an interrogation or a sampling which occurs when power-on conditions take effect to measure the signal strength of any optical signal emitted by the optical emitter 31 and received by the optical sensor 32. In an event the optical signal strength is measurably or significantly reduced as compared to the baseline signal strength, the processor 341 can interpret such an incident as an indication that the optical conductor 230 has assumed the optically non-transmitting state.

A distance between the outer surface (chassis side) of the optical conductor 230 and the surface 220 of the chassis component 22 and the distance between the outer surface (monitored component side) of the optical conductor 230 and the monitored component 21 are each established by the total distance between the monitored component 21 and the chassis component 22 and by the respective lengths of the one or more bosses 222 as measured from the plane P of the surface 220.

As shown in FIGS. 2 and 4 and FIG. 7, the extrusion 24 is disposed on the monitored component 21 to face and extend toward the chassis component 22 and to impact and then mechanically deflect or break the optical conductor 230 upon a predefined magnitude of deflection of the monitored component 21. That is, the total distance between the monitored component 21 and the chassis component 22 and the respective lengths of the one or more bosses 222 as measured from the plane P of the surface 220 may be set such that the extrusion 24 mechanically deflects or breaks the optical conductor 230 upon the predefined magnitude of deflection of the monitored component 21 with the predefined magnitude of deflection being set at or below the deflection tolerances for the monitored component 21. In this way, in an event the deflection of the monitored component 21 occurs such that mechanical deflection or breakage of the optical conductor 230 by the extrusion 24 also occurs, such mechanical deflection or breakage can and will be sensed by the sensor 23 so that mitigating actions can be taken if necessary.

In accordance with embodiments, the extrusion 24 may be formed of or may include materials that are harder than those of the optical conductor 230. In this way, a breakage-level impact between the extrusion and the optical conductor 230 will result in the mechanical deflection or breakage of the optical conductor 230 and not the extrusion 24.

In accordance with embodiments, the total distance between the monitored component 21 and the chassis component 22 and the respective lengths of the one or more bosses 222 as measured from the plane P of the surface 220 may be set or sized so as to provide for a clean mechanical breakage of the optical conductor 230. That is, in an event of an excessive deflection of the monitored component 21, the distance between the optical conductor 230 and the surface 220 will be sufficient for allowing a complete mechanical breakage of the optical conductor 230.

Figure 8:
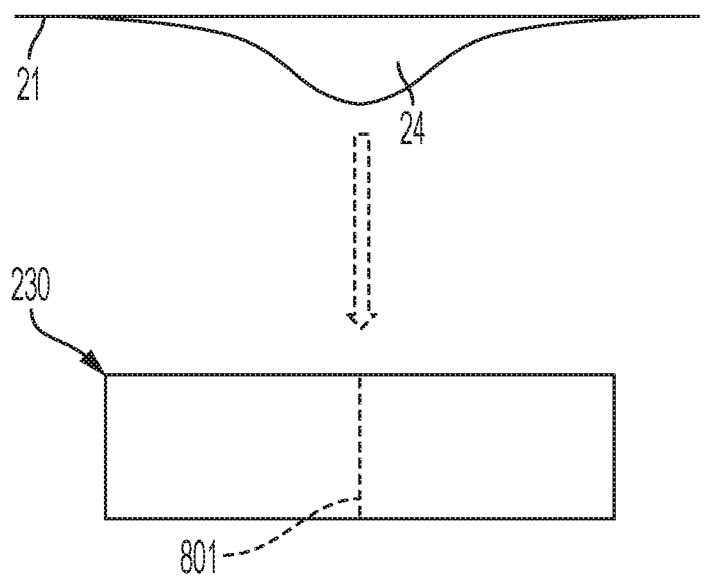
FIG. 8 is an enlarged view of components of the opto-mechanical fuse of FIGS. 2-7 in accordance with further embodiments.

In accordance with further embodiments and, with reference to FIG. 8, the optical conductor 230 may be made of brittle material such as rigid and optically conducting fiber, glass, laminate or composite material having known break strengths which are known from empirical calculations relative to a prototype and are tuned or which are derived using known material properties (e.g., Young's modulus and stress curves for non-ductile materials). In addition, as shown in FIG. 8, the optical conductor 230 may be pre-cracked at a location 801 which corresponds to the projected impact location of the extrusion 24. This pre-cracking may facilitate or encourage an appropriate mechanical breakage of the optical conductor 230.

Figure 9:
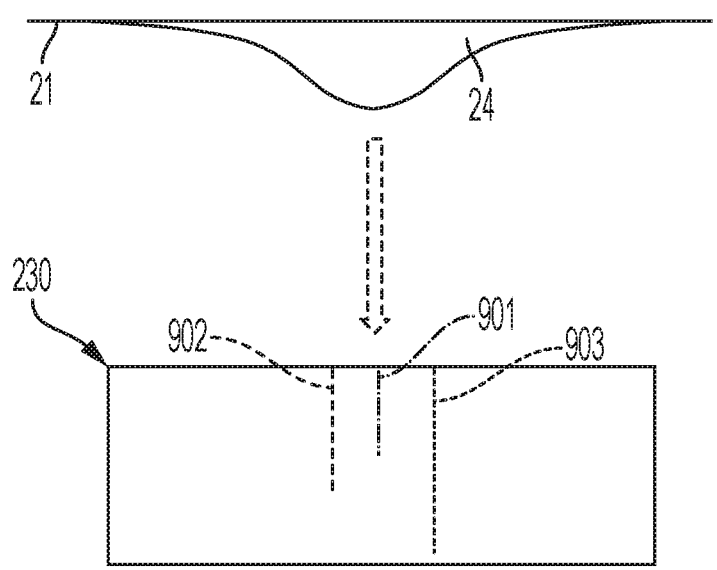
FIG. 9 is an enlarged view of components of the opto-mechanical fuse of FIGS. 2-7 in accordance with further embodiments.

In accordance with further embodiments and, with reference to FIG. 9, the optical conductor 230 can be configured for mechanical deflection or breakage in multiple stages 901, 902 and 903. Here, the stage 901 may correspond to a deflection of the monitored component 21 that is undesirable and an event to be sensed but not necessarily one that is associated with a damaging incident (i.e., the optical conductor 230 slightly deflects and correspondingly transmits an optical signal of slightly decreased signal strength), the stage 902 may correspond to a deflection of the monitored component 21 that is at or slightly in excess of the deflection tolerances and thus may be associated with damage requiring maintenance (i.e., the optical conductor 230 substantially deflects and correspondingly transmits an optical signal of substantially decreased signal strength) and the stage 903 may be associated with substantial deflection of the monitored component 21 that is likely to be associated with damage requiring replacement of the monitored component 21 (i.e., the optical conductor 230 breaks and correspondingly transmits no optical signal of any signal strength). In each case, the circuitry 34 can be configured to correspondingly sense decreased or missing optical transmissions through the optical conductor 230, which are consistent with the current degree of deflection or breakage, and to electrically signal occurrences of the mechanical breakages in each of the multiple stages 901, 902 and 903.

Figure 10:
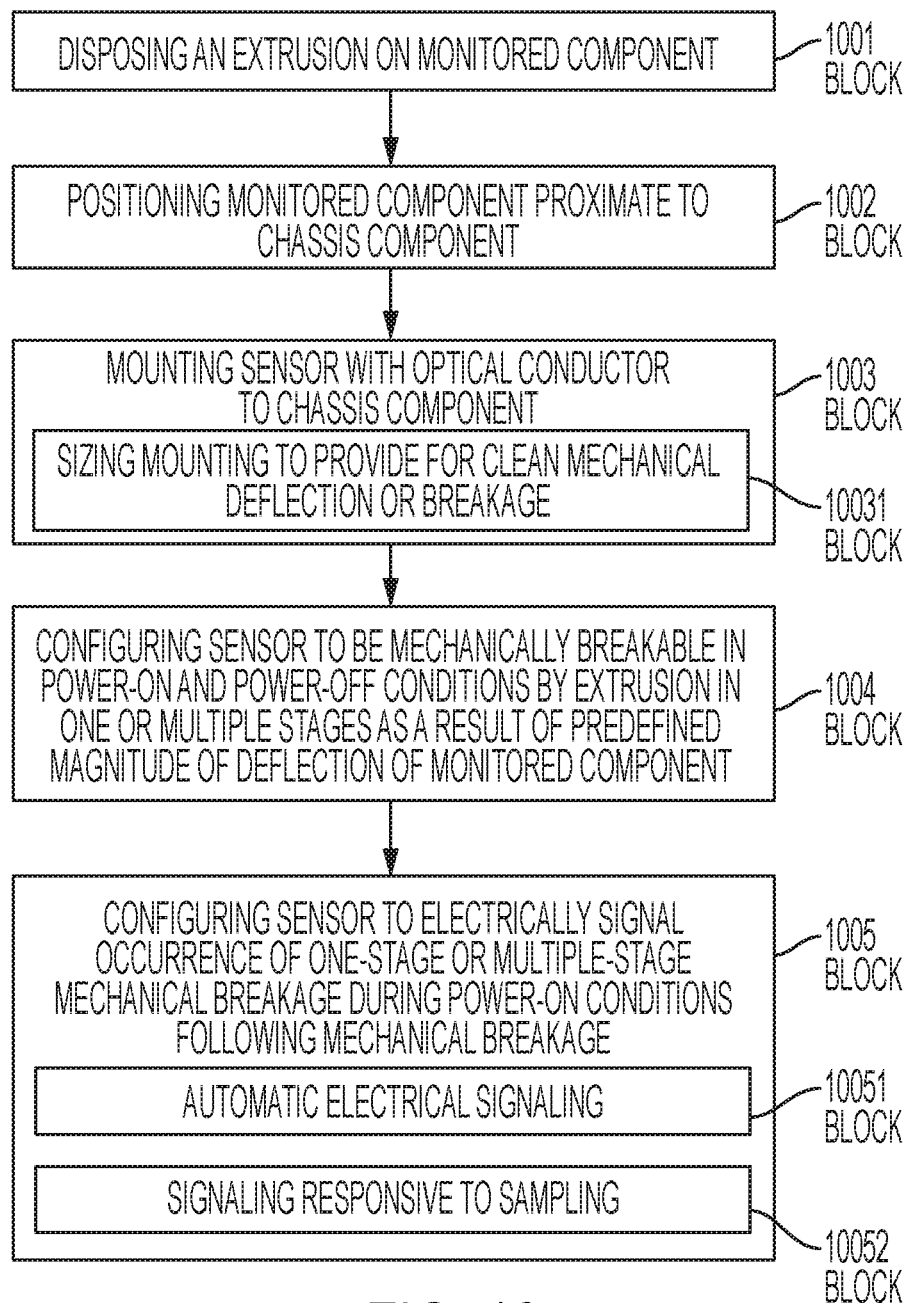
FIG. 10 is a flow diagram illustrating a method of operating an opto-mechanical fuse in accordance with embodiments.

With reference to FIG. 10, a method of operating an opto-mechanical fuse for detecting a predefined magnitude of deflection of a monitored component is provided. The method initially includes disposing an extrusion on the monitored component (block 1001) and then positioning the monitored component proximate to a chassis component (block 1002). The method also includes mounting a sensor with an optical conductor to the chassis component (block 1003) before, during or after the disposition of the extrusion and/or the positioning of the monitored component. The mounting may include, for example, sizing a mounting for the sensor to provide for clean mechanical deflection or breakage of the optical conductor (block 10031). The method further includes configuring the optical conductor of the sensor to be mechanically deflectable or breakable in power-on and power-off conditions by the extrusion in one or multiple stages as a result of the predefined magnitude of deflection of the monitored component (block 1004) and configuring the sensor to electrically signal an occurrence of the one-stage or multiple-stage mechanical deflection or breakage during power-on conditions following the mechanical breakage (block 1005).

In accordance with embodiments and, as described above, the sensor may include the optical conductor, the optical emitter and the optical sensor as described above and circuitry. The circuitry is configured to identify the mechanical deflection or breakage at an instant of the mechanical deflection or breakage (if the mechanical deflection or breakage occurred during power-on conditions being in effect) or upon the power-on conditions taking effect (if the mechanical deflection or breakage occurred during power-off conditions being in effect). The optical conductor is brittle and can be pre-cracked and the extrusion may be harder than the optical conductor.

In accordance with further embodiments and, as shown in FIG. 10, the method may also include configuring the sensor to automatically electrically signal the occurrence of the one-stage or multiple-stage mechanical deflection or breakage (block 10051) or to do so in response to an interrogation or sampling (block 10052).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An opto-mechanical fuse, comprising:
a chassis component;
an extrusion disposed on a monitored component proximate to the chassis component; and
a sensor comprising an optical conductor mounted to the chassis component to assume one of an optically transmitting state and an optically non-transmitting state in both power-on and power-off conditions,
an assumption of the optically non-transmitting state by the optical conductor being characterized by a breakage of the optical conductor occurring due to an interaction of the optical conductor and the extrusion resulting from a predefined magnitude of deflection of the monitored component whereby the extrusion comes into contact with and then breaks the optical conductor.

2. The opto-mechanical fuse according to claim 1, wherein:
the chassis component is disposable within a computing device housing,
the chassis component comprises a surface and a mounting for the sensor, and
the mounting comprises bosses extending from the surface and sized for clean deflection or breakage of the optical conductor and mounting clips to mount the optical conductor to the bosses.

3. The opto-mechanical fuse according to claim 1, wherein the sensor comprises:
the optical conductor;
an optical emitter; and
an optical sensor,
the optical sensor being receptive of an optical signal emitted by the optical emitter and transmitted through the optical conductor in an exclusive event the optical conductor assumes the optically transmitting state.

4. The opto-mechanical fuse according to claim 3, wherein the optical conductor is brittle.

5. The opto-mechanical fuse according to claim 3, wherein the assumption of the optically non-transmitting state by the optical conductor results in a measurable decrease in light transmission through the optical conductor.

6. The opto-mechanical fuse according to claim 3, further comprising an elastic element disposed to urge the optical conductor toward the assumption of the optically non-transmitting state.

7. The opto-mechanical fuse according to claim 3, wherein:
the optical emitter comprises a fiber link, an optical connector by which the fiber link is optically coupled to a first end of the optical conductor and a flexible retention sleeve supportive of the first end of the optical conductor, and
the optical sensor comprises a fiber link, an optical connector by which the fiber link is optically coupled to a second end of the optical conductor and a flexible retention sleeve supportive of the second end of the optical conductor.

8. The opto-mechanical fuse according to claim 3, wherein at least one of the optical emitter and the optical sensor are remotely connected to the optical conductor.

9. The opto-mechanical fuse according to claim 1, wherein the sensor further comprises circuitry configured to signal an occurrence of the assumption of the optically non-transmitting state.

10. The opto-mechanical fuse according to claim 1, wherein:
the optical conductor is configured to break in multiple stages,
the assumption of the optically non-transmitting state is preceded by assumptions of decreased optical transmission states corresponding to the multiple stages, and
the sensor further comprises circuitry configured to signal occurrences of the assumptions of the decreased optical transmission states.

11. An opto-mechanical fuse, comprising:
a chassis component disposable within a computing device housing;
an extrusion disposed on a monitored component proximate to the chassis component; and
a sensor comprising an optical conductor mounted to the chassis component to permit clean deflection or breakage of the optical conductor such that the optical conductor assumes one of an optically transmitting state and an optically non-transmitting state in both power-on and power-off conditions, an assumption of the optically non-transmitting state by the optical conductor occurring due to breakage of the optical conductor by the extrusion resulting from monitored component deflection of a predefined magnitude whereby the extrusion comes into contact with and then breaks the optical conductor, and the assumption of the optical non-transmitting state by the optical conductor resulting in a measurable decrease in light transmission through the optical conductor.

12. The opto-mechanical fuse according to claim 11, wherein the sensor comprises:

the optical conductor;
an optical emitter; and
an optical sensor,
the optical sensor being receptive of an optical signal emitted by the optical emitter and transmitted through the optical conductor in an exclusive event the optical conductor assumes the optically transmitting state.

13. The opto-mechanical fuse according to claim 12, wherein the optical conductor is brittle.

14. The opto-mechanical fuse according to claim 12, further comprising an elastic element disposed to urge the optical conductor toward the assumption of the optically non-transmitting state.

15. The opto-mechanical fuse according to claim 12, wherein:

the optical emitter comprises a fiber link, an optical connector by which the fiber link is optically coupled to a first end of the optical conductor and a flexible retention sleeve supportive of the first end of the optical conductor, and the optical sensor comprises a fiber link, an optical connector by which the fiber link is optically coupled to a second end of the optical conductor and a flexible retention sleeve supportive of the second end of the optical conductor.

16. The opto-mechanical fuse according to claim 12, wherein at least one of the optical emitter and the optical sensor are remotely connected to the optical conductor.

17. The opto-mechanical fuse according to claim 11, wherein the sensor further comprises circuitry configured to signal an occurrence of the assumption of the optically non-transmitting state.

18. The opto-mechanical fuse according to claim 11, wherein:

the optical conductor is configured to break in multiple stages, the assumption of the optically non-transmitting state is preceded by assumptions of decreased optical transmission states corresponding to the multiple stages, and the sensor further comprises circuitry configured to signal occurrences of the assumptions of the decreased optical transmission states.

19. A method of operating an opto-mechanical fuse for detecting a predefined action of or relative to a monitored component, the method comprising:

disposing an extrusion on the monitored component with the monitored component proximate to a chassis component;

mounting a sensor to the chassis component;

configuring the sensor with an optical conductor to be breakable in power-on and power-off conditions by the extrusion as a result of the predefined action of or relative to the monitored component whereby the extrusion comes into contact with and then breaks the optical conductor; and configuring the sensor to determine whether an optical signal is transmittable through the optical conductor and to signal an occurrence of a breakage during power-on conditions following the breakage.

20. The method according to claim 19, wherein the configuring of the sensor to determine whether the optical signal is transmittable through the optical conductor comprises:

operating the sensor at an initial time to measure a baseline strength of an optical signal transmitted through the optical conductor;

operating the sensor at a later time following the initial time to measure a current strength of the optical signal transmitted through the optical conductor; and determining that the optical signal is not transmittable through the optical conductor in an event the current strength is measurably decreased as compared to the baseline strength.

* * * * *